(12) United States Patent
Ohmi et al.

(10) Patent No.: US 6,282,221 B1
(45) Date of Patent: *Aug. 28, 2001

(54) EXCIMER LASER OSCILLATION APPARATUS

(75) Inventors: Tadahiro Ohmi, Sendai; Nobuyoshi Tanaka, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,972

(22) Filed: Jul. 11, 1997

(30) Foreign Application Priority Data

Jul. 19, 1996 (JP) .................................... 8-208815

(51) Int. Cl.[7] ..................................... H01S 3/22
(52) U.S. Cl. ................... 372/57; 372/87; 372/38
(58) Field of Search ................ 372/57, 87, 38; 436/55; 428/469; 148/287

(56) References Cited

U.S. PATENT DOCUMENTS

| | | | |
|---|---|---|---|
| 4,937,834 | * | 6/1990 | Egawa ..................................... 372/38 |
| 4,956,847 | * | 9/1990 | Terai et al. .............................. 372/87 |
| 4,975,921 | * | 12/1990 | Rothe ..................................... 372/38 |
| 5,009,963 | * | 4/1991 | Ohmi et al. ........................... 428/469 |
| 5,072,191 | * | 12/1991 | Nakajima et al. ...................... 372/38 |
| 5,090,021 | * | 2/1992 | Nakatani et al. ....................... 372/38 |
| 5,149,659 | * | 9/1992 | Hakuta et al. .......................... 436/55 |
| 5,181,217 | * | 1/1993 | Sato et al. .............................. 372/38 |
| 5,280,536 | * | 1/1994 | Dumond et al. ....................... 372/38 |
| 5,293,390 | * | 3/1994 | Furuya et al. .......................... 372/38 |
| 5,307,364 | * | 4/1994 | Turner ................................... 372/57 |
| 5,309,462 | * | 5/1994 | Taylor et al. ........................... 372/38 |
| 5,373,523 | * | 12/1994 | Fujimoto et al. ...................... 372/57 |
| 5,383,217 | * | 1/1995 | Uemura ................................. 372/58 |
| 5,407,492 | * | 4/1995 | Ohmi et al. .......................... 148/287 |
| 5,450,436 | * | 9/1995 | Mizoguchi et al. ................... 372/57 |
| 5,642,374 | * | 6/1997 | Wakabayashi et al. ............... 372/57 |
| 5,661,744 | * | 8/1997 | Murakami et al. .................... 372/57 |
| 5,729,562 | * | 3/1998 | Birx et al. .............................. 372/38 |
| 5,825,795 | * | 10/1998 | Yamashita et al. .................... 372/38 |
| 5,923,693 | * | 7/1999 | Ohmi et al. ............................ 372/57 |

* cited by examiner

*Primary Examiner*—Leon Scott, Jr.
(74) *Attorney, Agent, or Firm*—Fitzpatrick, Cella, Harper & Scinto

(57) ABSTRACT

An excimer laser oscillation apparatus comprises a laser chamber for storing a laser gas, a pair of electrodes arranged in the chamber, and a voltage application circuit for applying a voltage to the pair of electrodes to excite the laser gas. A fluorine passivation film is formed on an inner surface of said laser chamber. The excimer laser apparatus further has a circuit for applying a voltage to the pair of electrodes to flow a current that exceeds a light-emission threshold value between the pair of electrodes while alternately changing a flowing direction thereof. And, the pair of electrodes have an oxygen content of not more than 10 ppm.

10 Claims, 12 Drawing Sheets

EXCIMER LASER OSCILLATION APPARATUS

BACKGROUND OF THE INVENTION

1. Field of the Invention

The present invention relates to an excimer laser oscillation apparatus used in processing various works, and its driving method.

2. Related Background Art

An excimer laser has received a lot of attention as the one and only high-power laser that can oscillate in the ultraviolet range, and its applications are expected in the electronics, chemical, and energy industries.

More specifically, the excimer laser is used in processes, chemical reactions, and the like of metals, resins, glass, ceramics, photoresists, semiconductors, and the like.

An apparatus that generates an excimer laser beam is known as an excimer laser oscillation apparatus. FIG. 15 shows an example of the arrangement of the apparatus.

A pair of electrodes 54 and 55 are arranged in a laser chamber 51 for storing a laser gas. A voltage application circuit for applying a voltage to excite the laser gas is connected to the pair of electrodes 54 and 55.

A laser gas mixture containing, e.g., $F_2$, Ar, Kr, Xe, $Cl_2$, and the like filled in the laser chamber is excited by electron beam radiation, discharging, or the like. The excited atoms bind to atoms in the ground or base bottom state to form molecules that can exist in only an excited state. Such molecules are called excimers. Since the excimers are unstable, they immediately emit ultraviolet rays and drop to the ground state. Such phenomenon is called bond-free transition, and the excimer laser oscillation apparatus amplifies ultraviolet rays obtained by that transition in an optical resonator made up of a pair of reflection mirrors and outputs a laser beam.

Since a KrF laser and ArF laser of excimer lasers use highly reactive fluorine gas as a laser gas, the concentration of fluorine in the laser chamber that stores the laser gas and gives discharging energy to the gas drops eventually. In consideration of this, the voltage supplied to the laser chamber is raised so as to obtain a predetermined output. When the predetermined output becomes hard to obtain even by such control, oscillation is interrupted, and fluorine gas is refilled.

When oscillation continues, the predetermined laser output cannot be obtained, even by refilling fluorine, and the laser chamber must be exchanged in such state.

FIG. 16A shows an example of a conventional laser oscillation circuit. When a thyratron is used as a switch for starting oscillations, after ringing components of a capacitance $C_p$ shown in FIG. 16B are produced. In view of this problem, the thyratron of the laser oscillation circuit is replaced by a thyristor as a semiconductor element to suppress the after ringing components and to prolong the service life of the laser, as shown in FIG. 17A. Note that no light emission occurs at a positive $C_p$ voltage of +5 to +6 kV in FIGS. 16B and 17B since no discharging takes place and no currents flow at that voltage.

However, even with this apparatus, as shown in FIG. 18, fluorine must be refilled at predetermined periods, and oscillations must be done while raising the applied voltage. In other words, fluorine refilling is still required since the fluorine concentration decreases as time passes. For this reason, the service life of the laser chamber is not satisfactory, especially when the laser is used for a long period of time to work articles. The service life of the chamber is an important factor in improving the manufacturing throughput of articles.

SUMMARY OF THE INVENTION

The present invention has been made in consideration of the above-mentioned technical problems and has as its principal object to provide a laser oscillation apparatus which can obtain a desired laser output even after laser oscillations are performed for a longer period of time than the conventional apparatus.

It is another object of the present invention to provide a laser oscillation apparatus which is suitable for the manufacture of semiconductor devices such as photolithography.

According to the present invention, a method of driving an excimer laser oscillation apparatus which has a laser chamber for storing a laser gas, a pair of electrodes arranged in the chamber, and a voltage application circuit for applying a voltage to the pair of electrodes to excite the laser gas, is characterized in that the voltage is applied to change the direction of a current flowing between the pair of electrodes at a predetermined period.

According to the present invention, an excimer laser oscillation apparatus which has a laser chamber for storing a laser gas, a pair of electrodes arranged in the chamber, and a voltage application circuit for applying a voltage to the pair of electrodes to excite the laser gas, is characterized by comprising:

first charge accumulation means for supplying a current in a first direction between the pair of electrodes; and second charge accumulation means for supplying a current in a second direction different from the first direction.

DETAILED DESCRIPTION OF THE PREFERRED EMBODIMENTS

Figure 1:
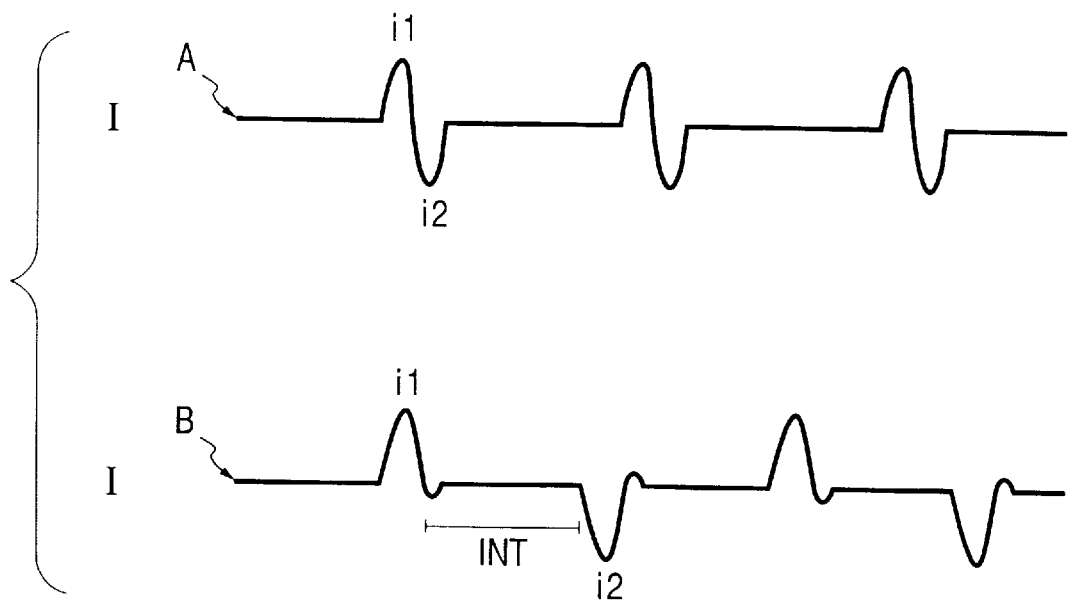
FIG. 1 is a chart for explaining the states of currents that flow through the discharging electrodes of an excimer laser oscillation apparatus according to the present invention.

FIG. 1 is a chart for explaining currents flowing between a pair of discharging electrodes in a laser chamber of an excimer laser oscillation apparatus according to an embodiment of the present invention.

In FIG. 1, curve A indicates a state wherein immediately after a first current $i_1$ which has one direction and a current value exceeding a light-emission threshold value flows, a second current $i_2$ which has the other direction and a current value nearly equal to that of the first current flows. On the other hand, curve B in FIG. 1 indicates a state wherein a predetermined period INT after the first current $i_1$ flows in one direction, the second current $i_2$ which has the other direction and a current value nearly equal to that of the first current flows. A laser beam is generated in accordance with these currents $i_1$ and $i_2$.

The arrangement of a driving circuit for applying a voltage so that the directions of currents that flow between the pair of discharging electrodes change at predetermined periods will be explained below.

Figure 2:
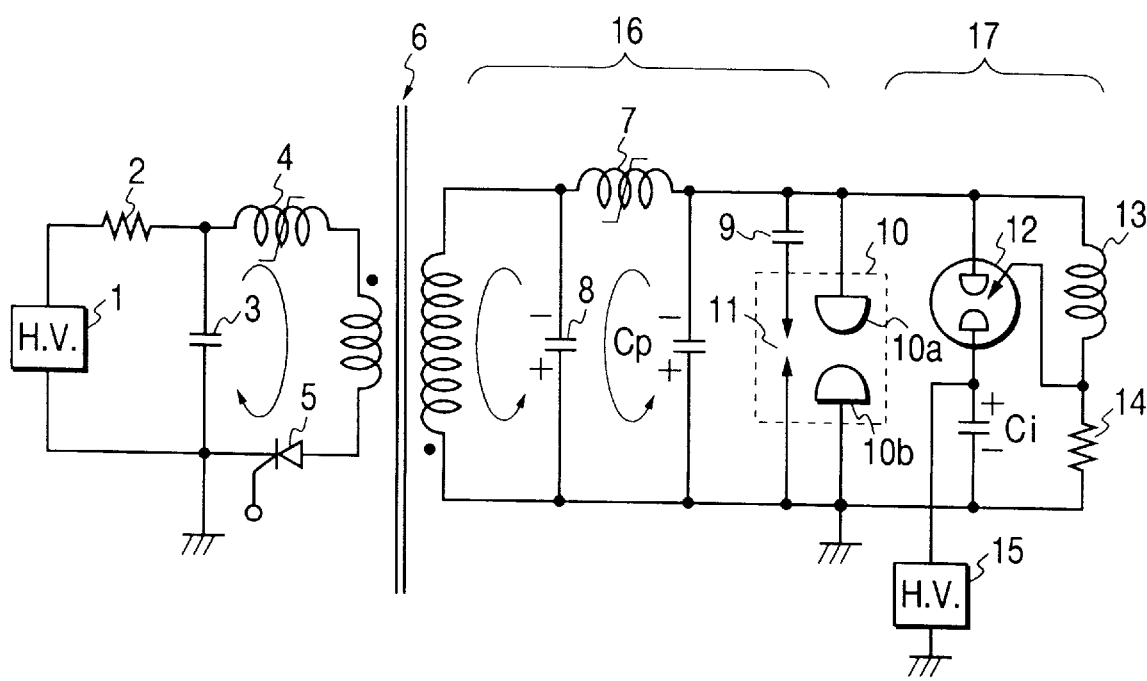
FIG. 2 is a circuit diagram showing a driving circuit for an excimer laser oscillation apparatus according to a preferred embodiment of the present invention.

FIG. 2 is a circuit diagram of a laser oscillation apparatus according to the preferred embodiment of the present invention. The circuit shown in FIG. 2 has a high-voltage power source 1 that can generate a voltage as high as about 1 kV, a charging resistor 2, a capacitor 3 for accumulating charges, a magnetic switch 4 for narrowing the pulse width, and a thyristor 5 that receives a trigger signal for starting laser oscillations. The power source 1, resistor 2, capacitor 3, magnetic switch 4, and thyristor 5 constitute a primary coil circuit of a transformer 6. The turn ratio of the transformer 6 is, e.g., 1:20, and the primary and secondary coil sides have opposite turn directions. Identical circuits each including the capacitor 3 and the magnetic switch 4 may be connected in multiple stages to further narrow the pulse width.

At the secondary coil side of the transformer 6, capacitors 8, 9, and $C_p$, and a magnetic switch 7 are connected. A circuit 16 including the capacitors 8, 9, and $C_p$, and the magnetic switch 7 is connected to discharging electrodes 10a and 10b in a laser chamber 10. A pre-ionizer 11 is used for stably causing discharging.

The characteristic feature of this embodiment lies in a circuit 17 made up of a spark gap 12, a capacitor $C_i$, a coil 13, a resistor 14, and a high-voltage power source 15.

Figure 3A:
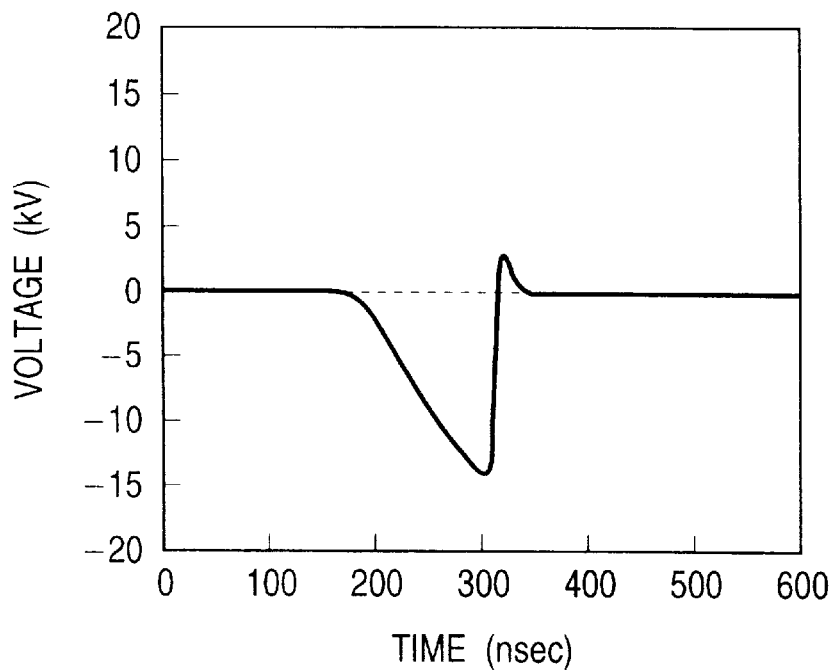
FIGS. 3A and 3B are graphs for explaining the characteristics of the excimer laser oscillation apparatus according to the preferred embodiment of the present invention.
Figure 3B:
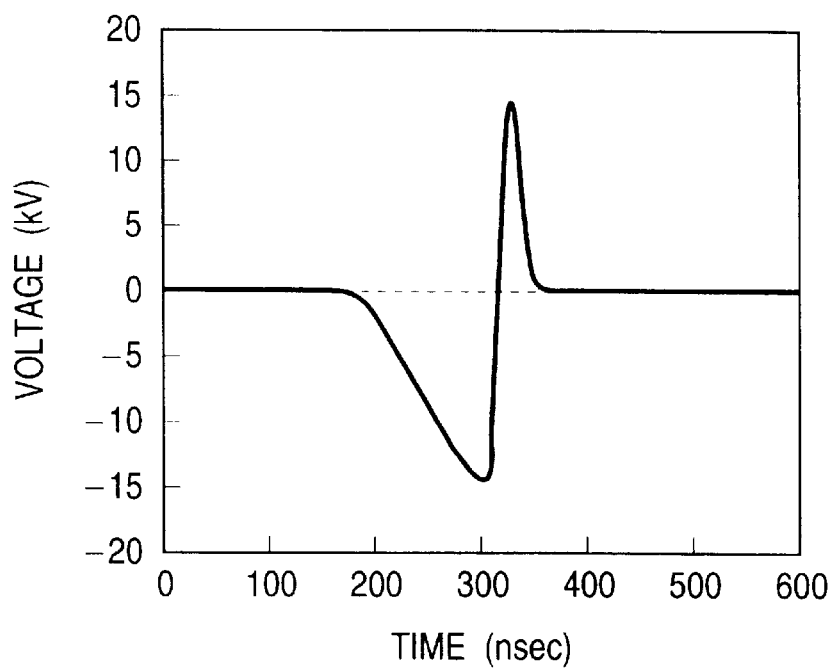

FIGS. 3A and 3B show the voltage waveform across the two terminals of the capacitor $C_p$ in a laser oscillation circuit having no circuit 17 (FIG. 3A), and the voltage waveform across the two terminals of the capacitor $C_p$ in the laser oscillation circuit having the circuit 17 according to this embodiment (FIG. 3B).

The operation of the laser oscillation apparatus according to the embodiment of the present invention will be described below with reference to FIG. 2 and FIGS. 3A and 3B.

First, the charge accumulation capacitor 3 is charged up to 1 kV using the high-voltage power source 1. The charge accumulation capacitor $C_i$ is charged up to 15 kV using the high-voltage power source 15. Thereafter, when a trigger signal is input to the thyristor 5 to enable it, the charge stored on the capacitor 3 is discharged. At that time, a pulse voltage of about −15 kV is applied across the two terminals of the capacitor 8 located at the secondary coil side of the transistor 6.

On the other hand, a voltage whose pulse width is shortened to about 150 ns by the magnetic switch 7 appears across the two terminals of the capacitor $C_p$. When the voltage applied across the two terminals of the capacitor $C_p$ changes from −15 kV to 0 V, the pre-ionizer 11 starts discharging and produces free electrons having a density of about $10^6$ to $10^7$ cm$^{-3}$ in the laser chamber.

Thereafter, uniform discharging takes places between the discharging electrodes 10a and 10b, thus oscillating a laser beam. When no circuit 17 is arranged, the voltage rises from −15 kV to only 0 V, as shown in FIG. 3A, but when the circuit 17 is arranged, the voltage rises up to +15 kV, as shown in FIG. 3B.

The operation at that time will be explained below.

When the voltage applied across the two terminals of the capacitor $C_p$ has changed abruptly, most high-frequency voltage components are applied to the coil 13. This is because the impedance of the coil 13 is set to be higher than that of the resistor 14. When a large voltage is applied across the two terminals of the coil 13, the spark gap 12 sparks and is conducted. With this operation, the charge on the capacitor $C_i$ is discharged, and the voltage applied between the discharging electrodes 10a and 10b rises up to about 15 kV. At this time, discharging takes places between the discharging electrodes 10a and 10b, and currents flow in the reverse direction, at that time. If the currents flowing at that time are designed to exceed the light-emission threshold value, light emission can be obtained.

As described above, since the present invention comprises the circuit 17, the following effects are expected as compared to the apparatus without any circuit 17.

Since positive and negative currents alternately flow, the upper and lower discharging electrodes deteriorate symmetrically, and deterioration of the electrodes can be suppressed as compared to the conventional apparatus. As a consequence, the service life with respect to a given laser output amount can be doubled or more. Also, the laser output amount per unit time can be approximately doubled.

Figure 4:
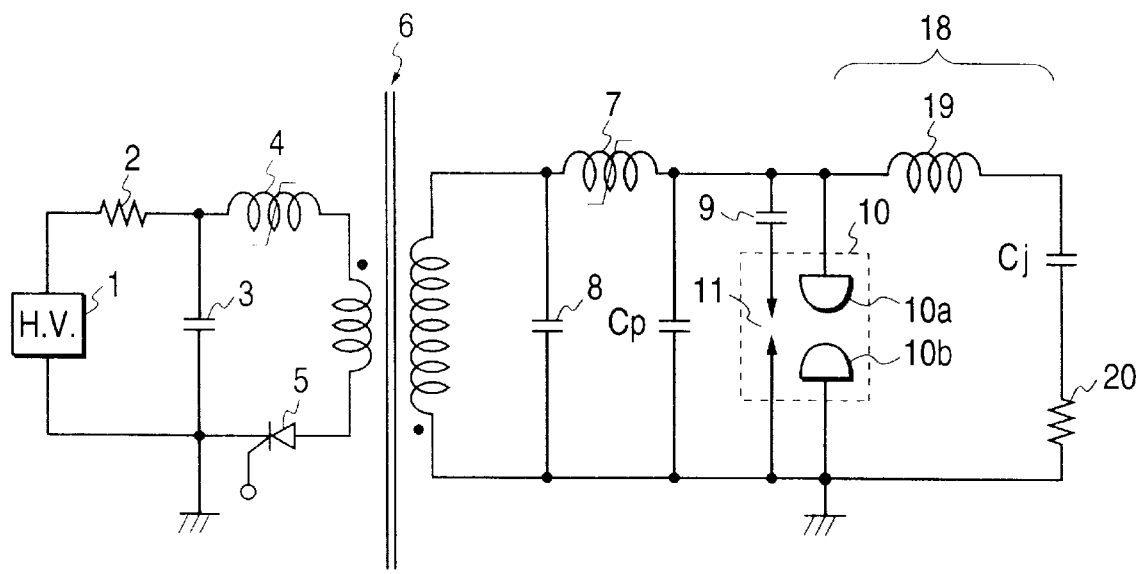
FIG. 4 is a circuit diagram showing a driving circuit for an excimer laser oscillation apparatus according to another preferred embodiment of the present invention.
Figure 5:
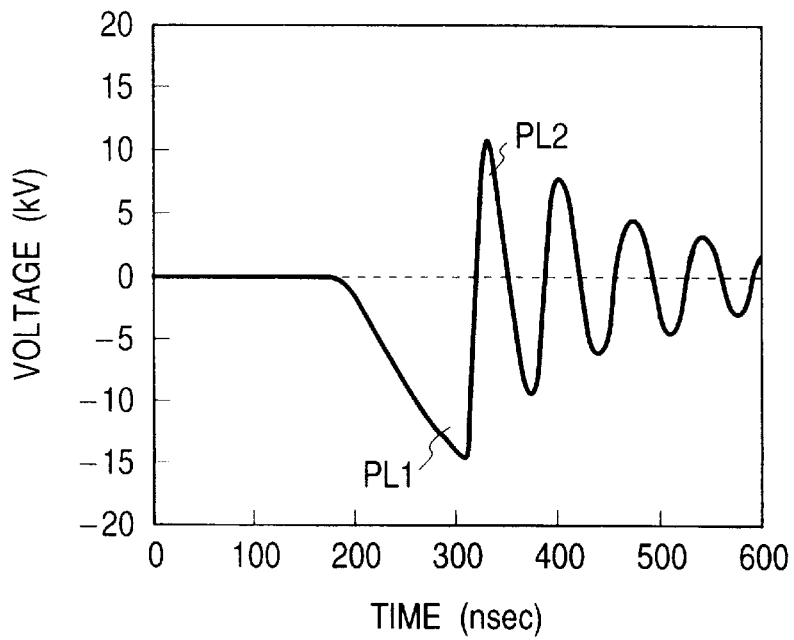
FIG. 5 is a graph for explaining the characteristics of the excimer laser oscillation apparatus according to the other preferred embodiment of the present invention.

FIG. 4 is a circuit diagram of a laser oscillation apparatus according to another preferred embodiment of the present invention. The difference from the circuit shown in FIG. 2 is that a circuit 18 is arranged in place of the circuit 17. The circuit 18 has a coil 19, a capacitor $C_j$, and a resistor 20. FIG. 5 shows the voltage waveform across the two terminals of the capacitor $C_p$ in the laser oscillation circuit having the circuit 18 according to the present invention.

The operation of the laser oscillation apparatus of the present invention will be described below with reference to FIGS. 4 and 5.

In the same manner as in the case using the circuit arrangement shown in FIG. 2, the charge accumulation capacitor 3 is charged up to 1 kV using the high-voltage power source 1. Thereafter, when a trigger signal is input to the thyristor 5 to enable it, the charge that has been built up on the capacitor 3 is discharged. At that time, a pulse voltage of about −15 kV is applied across the two terminals of the capacitor 8.

On the other hand, a voltage whose pulse width is shortened to about 150 ns by the magnetic switch 7 appears across the two terminals of the capacitor $C_p$. When the voltage applied across the two terminals of the capacitor $C_p$ changes from −15 kV to 0 V, the pre-ionizer 11 starts discharging and produces free electrons having a density of about $10^6$ to $10^7$ cm$^{-3}$ in the laser chamber.

Thereafter, uniform discharging takes place between the discharging electrodes 10a and 10b, thus oscillating a laser beam. When no circuit 18 is arranged, the voltage rises from −15 kV to only 0 V, as shown in FIG. 3A, but when the circuit 18 is arranged, the voltage attenuates while alternately changing its sign between positive and negative signs, as shown in FIG. 5. This is because oscillations are caused by the circuit 18 when the voltage applied across the two terminals of the capacitor $C_p$ has changed abruptly. The oscillation frequency can be determined by the coil 19, the capacitor $C_j$, and the resistor 20.

At that time, only pulses PL1 and PL2 are preferably designed to exceed the light-emission threshold value.

As described above, since the present invention comprises the circuit 18, the following effects are expected as compared to the apparatus without any circuit 18. Since positive and negative currents alternately flow, the upper and lower discharging electrodes deteriorate symmetrically, and deterioration of the electrodes can be suppressed as compared to the conventional apparatus. As a consequence, the service life with respect to a given laser output amount can be doubled or more. Also, the laser output amount per unit time can be approximately doubled.

Figure 6:
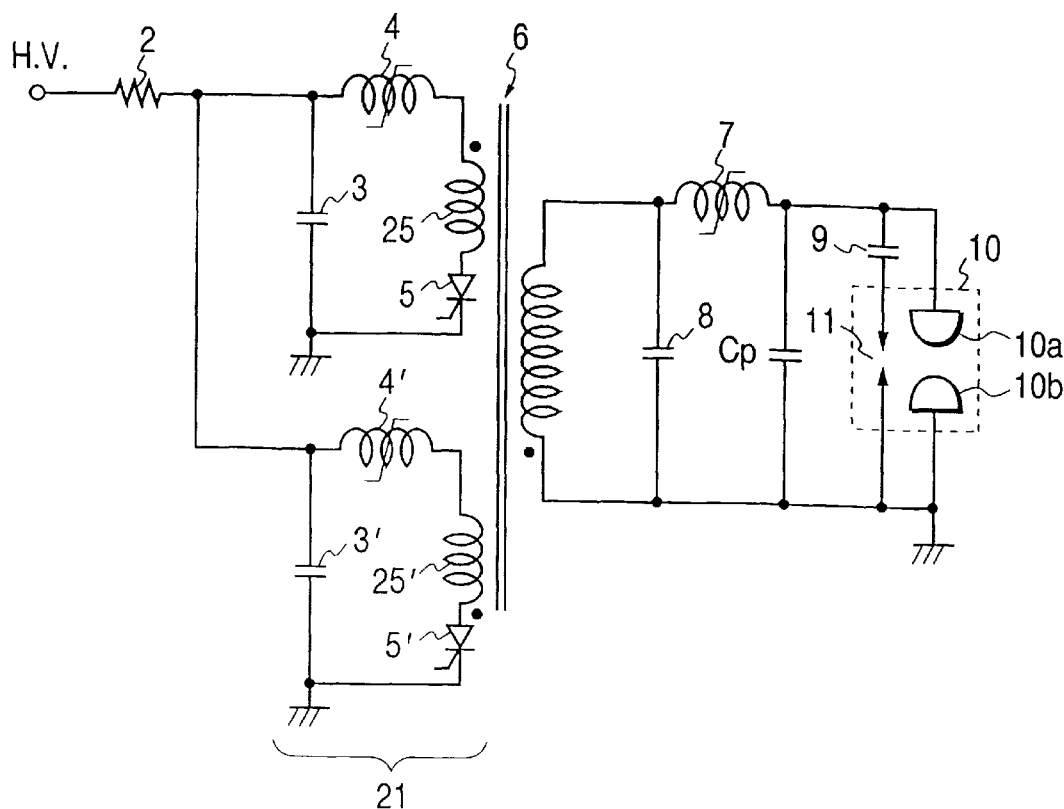
FIG. 6 is a circuit diagram showing a driving circuit for an excimer laser oscillation apparatus according to still another preferred embodiment of the present invention.

FIG. 6 is a circuit diagram of a laser oscillation apparatus according to still another embodiment of the present invention. The difference from the circuit shown in FIG. 4 is that a circuit 21 is arranged on the primary side of the transformer 6 in place of the circuit 18. The circuit 21 has the same arrangement (3', 4', 5', and 25') as that including the capacitor 3, the magnetic switch 4, the thyristor 5, and a primary coil 25 of the transformer. The only difference between these two arrangements is that the coils 25 and 25' have different turn directions.

Figure 7:
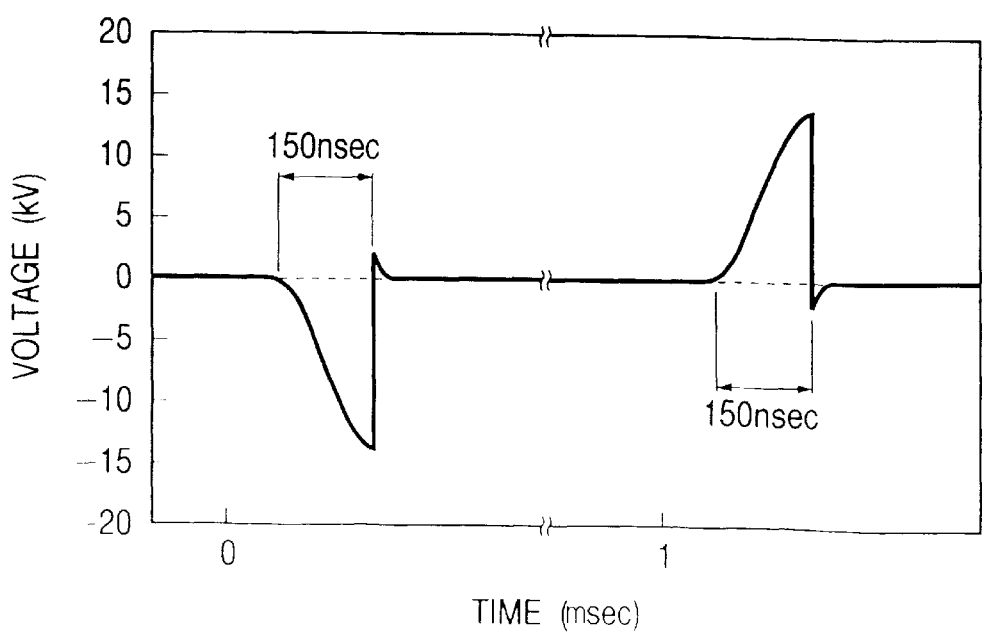
FIG. 7 is a graph for explaining the characteristics of the excimer laser oscillation apparatus (FIG. 6) according to the other preferred embodiment of the present invention.

FIG. 7 shows the voltage waveform across the capacitor $C_p$ in the laser oscillation circuit having the circuit 21 according to the present invention.

The operation of the laser oscillation apparatus according to the embodiment of the present invention will be described below with reference to FIGS. 6 and 7.

In the same manner as in the case using the circuit arrangement shown in FIG. 2, the charge accumulation capacitors 3 and 3' are charged up to 1 kV using the high-voltage power source 1. Thereafter, when a trigger signal is input to the thyristor 5 to enable it, the charges accumulated on the capacitors 3 and 3' are discharged. At that time, a pulse voltage of about −15 kV is applied across the two terminals of the capacitor 8.

Also, a voltage whose pulse width is shortened to about 150 ns by the magnetic switch 7 appears across the two terminals of the capacitor $C_p$, as shown in FIG. 7. When the voltage applied across the two terminals of the capacitor $C_p$ changes from −15 kV to 0 V, the pre-ionizer 11 starts discharging and produces free electrons having a density of about $10^6$ to $10^7$ cm$^{-3}$ in the vicinity of the discharging electrodes in the laser chamber.

Thereafter, uniform discharging takes places between the discharging electrodes 10a and 10b, thus oscillating a laser beam. Subsequently, the charge accumulation capacitors 3 and 3' from which charges are removed by discharging are charged up to 1 kV within 1 ms using the high-voltage power source 1. After an elapse of a predetermined interval, when a trigger signal is input in turn to the thyristor 5' to enable it, the charge on the capacitor 3 is discharged. At that time, a pulse voltage of about +15 kV is applied across the two terminals of the capacitor 8.

Also, a voltage whose pulse width is shortened to about 150 ns by the magnetic switch 7 appears across the two terminals of the capacitor $C_p$, as shown in FIG. 7, thus oscillating a laser beam. Likewise, when trigger signals are alternately input to the thyristors 5 and 5' at 1-ms intervals, pulse voltages shown in FIG. 7 can be generated across the two terminals of the capacitor $C_p$.

Note that by adding the circuit 21, the withstand voltage of the thyristors 5 and 5' becomes twice that required when no circuit 21 is arranged, i.e., a withstand voltage of at least 2 kV is required in this case.

As described above, since the present invention comprises the circuit 21 including the elements 3', 4', and 5', the following effects are expected as compared to the apparatus without any circuit 21. Since positive and negative currents alternately flow, the upper and lower discharging electrodes deteriorate symmetrically, and deterioration of the electrodes can be suppressed as compared to the conventional apparatus. As a consequence, the service life with respect to a given laser output amount can be doubled or more.

Figure 8:
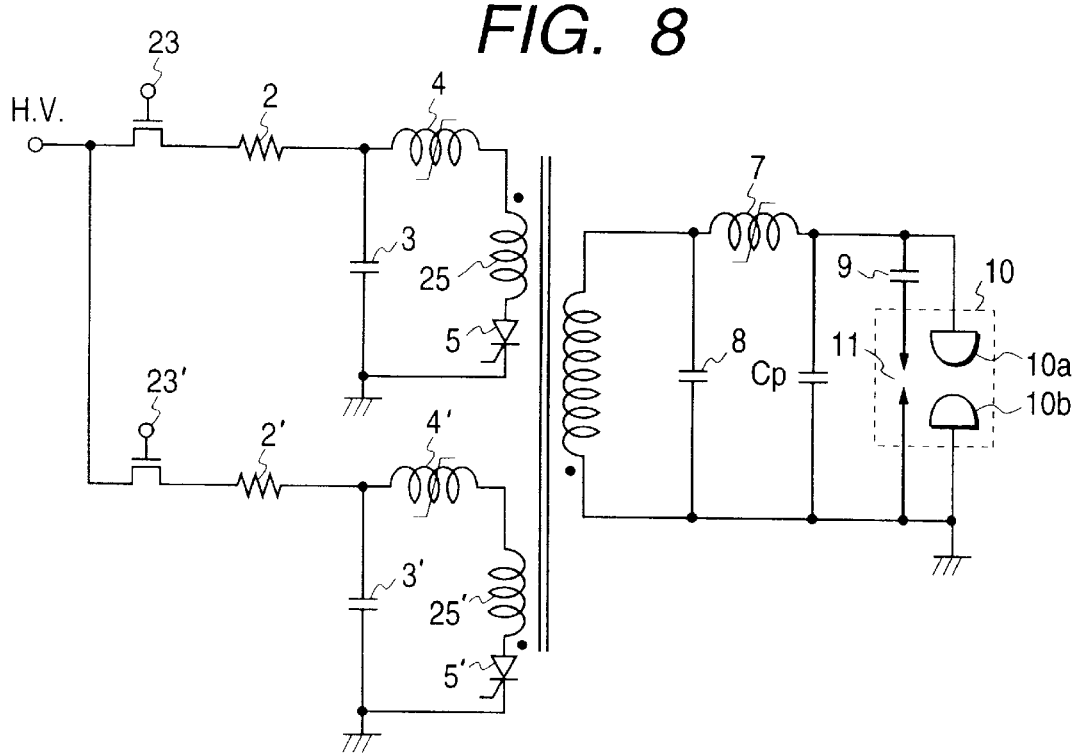
FIG. 8 is a circuit diagram showing another driving circuit of the excimer laser oscillation apparatus.

FIG. 8 is a circuit diagram of a laser oscillation apparatus according to still another embodiment of the present invention. The difference from the circuit shown in FIG. 6 is that two transistors 23' and two resistors 2' are parallelly arranged.

The voltage waveform across the two terminals of the capacitor $C_p$ in the laser oscillation circuit in FIG. 8 is the same as that shown in FIG. 7.

When a high power source voltage is selectively supplied to the capacitor 3 by turning on one of the two transistors 23 and turning off the other transistor 23, the direction of the voltage applied to the discharging electrodes is selected.

Figure 9:
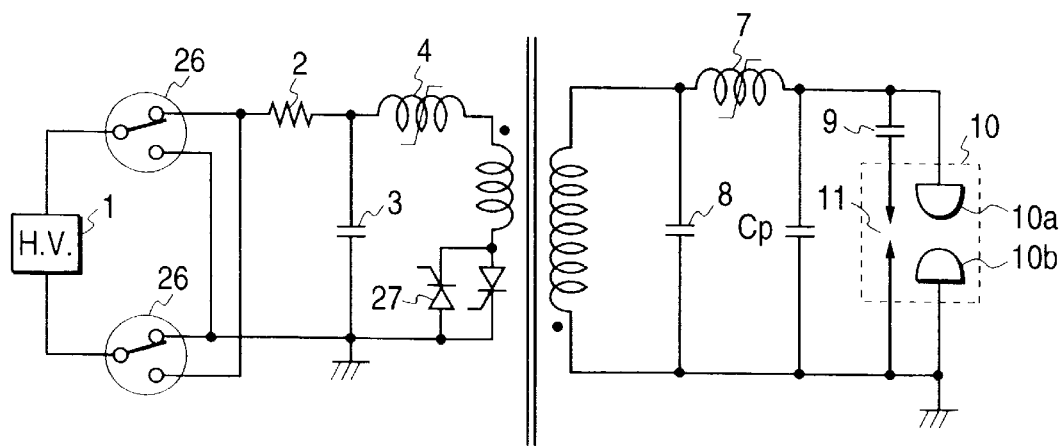
FIG. 9 is a circuit diagram showing still another driving circuit of the excimer laser oscillation apparatus.

FIG. 9 is a circuit diagram of a laser oscillation apparatus according to still another embodiment of the present invention. The difference from the circuit shown in FIG. 4 is that a switch 26 and a pair of thyristors 27 which are connected to terminals having opposite polarities to each other are arranged.

The voltage waveform across the two terminals of the capacitor $C_p$ in the laser oscillation circuit in FIG. 9 is the same as that shown in FIG. 7.

A single primary coil can be used, and the direction of the charging voltage to be supplied to the capacitor 3 can be selected by the switch 26.

Figure 10:
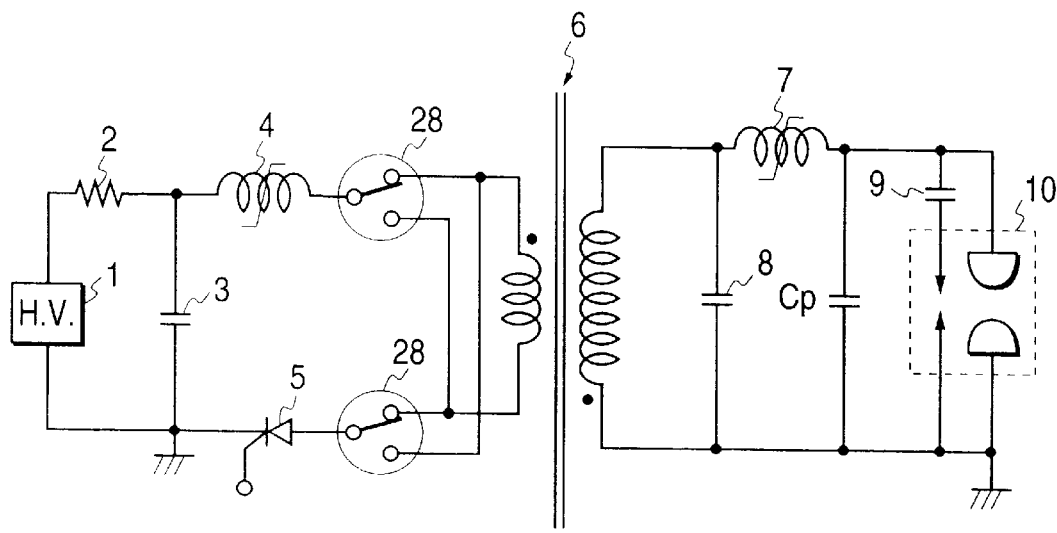
FIG. 10 is a circuit diagram showing still another driving circuit of the excimer laser oscillation apparatus.

FIG. 10 is a circuit diagram of a laser oscillation apparatus according to still another embodiment of the present invention. The difference from the circuit shown in FIG. 4 is that a switch 28 is arranged.

The voltage waveform across the two terminals of the capacitor $C_p$ in the laser oscillation circuit in FIG. 10 is the same as that shown in FIG. 7.

In the embodiment shown in FIG. 9, the direction of the charging voltage is changed, while in the embodiment shown in FIG. 10, the direction of currents flowing from the capacitor 3 toward the primary coil is changed by the switch 28.

Figure 11:
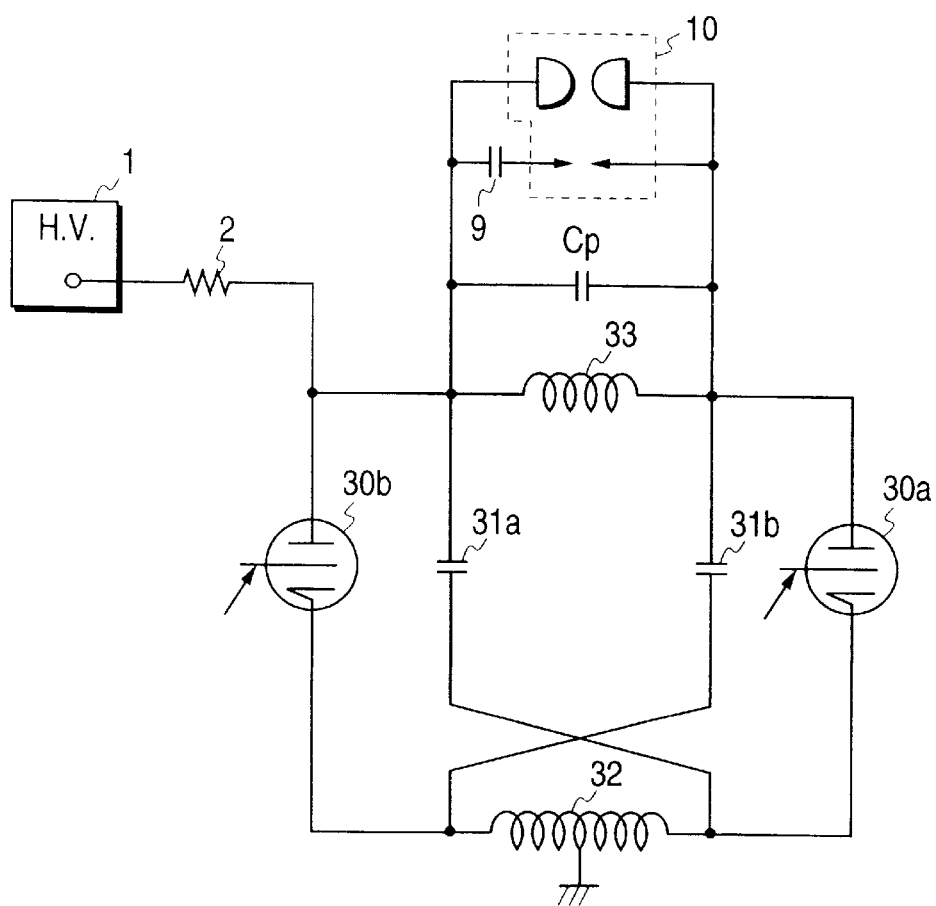
FIG. 11 is a circuit diagram showing still another driving circuit of the excimer laser oscillation apparatus.

FIG. 11 is a circuit diagram of a laser oscillation apparatus according to still another embodiment of the present invention. The voltage waveform across the two terminals of the capacitor $C_p$ in the laser oscillation circuit in FIG. 11 is the same as that shown in FIG. 7. The operation of the laser oscillation apparatus of the present invention will be described below with reference to FIG. 11.

Capacitors 31a and 31b are charged by the high-voltage power source 1. When a thyratron 30b is turned on, the capacitor 31b is discharged to charge the capacitor $C_p$. When this voltage has reached a threshold value, discharging takes place at the discharging electrodes of the laser, thus generating laser pulses. Subsequently, when the other thyratron 30a is turned on, the capacitor 31a is discharged to charge the capacitor $C_p$ in the opposite polarity, thus reversing the direction of the voltage to be applied to the discharging electrodes of the laser.

Figure 12:
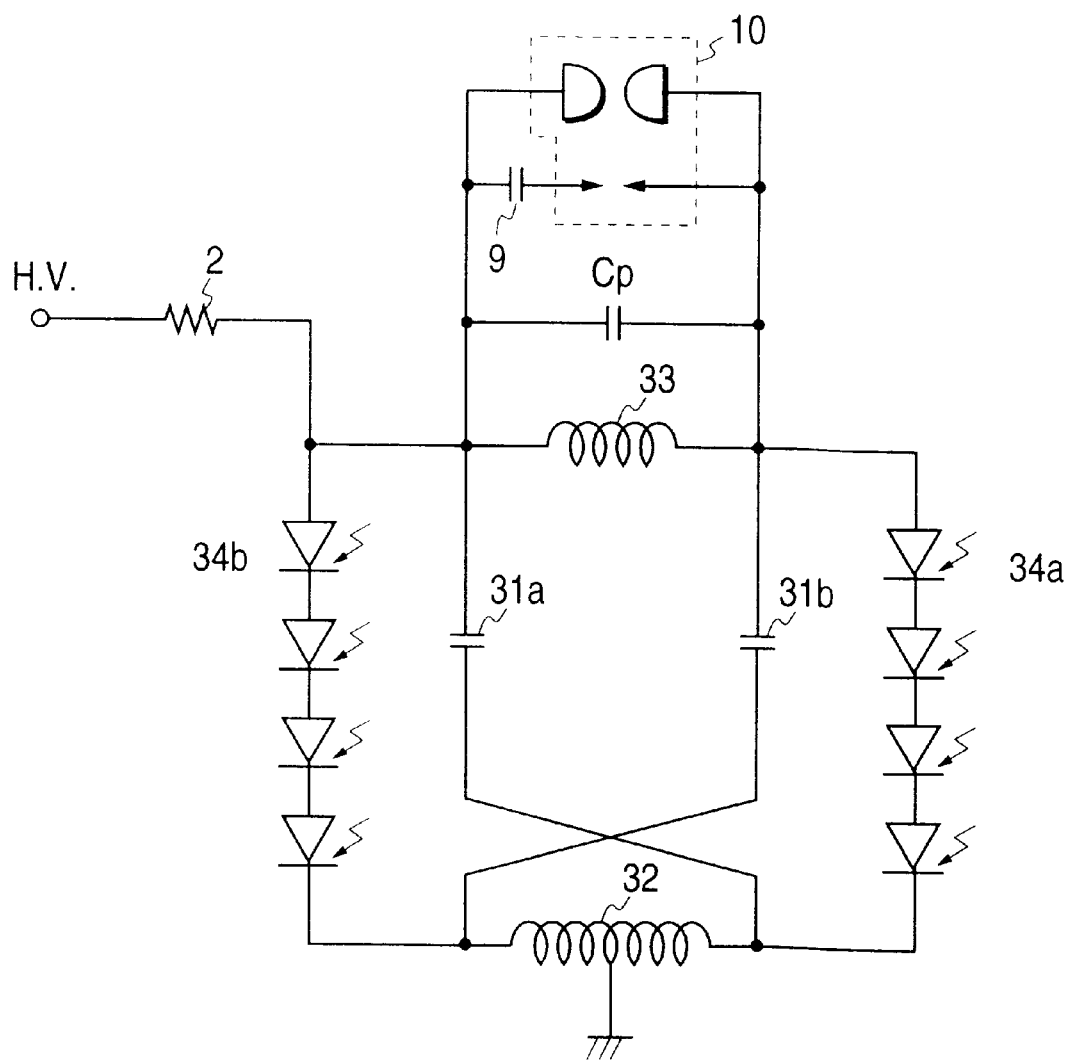
FIG. 12 is a circuit diagram showing still another driving circuit of the excimer laser oscillation apparatus.

FIG. 12 is a circuit diagram of a laser oscillation apparatus according to still another embodiment of the present invention. In this arrangement, the thyratrons 30a and 30b in FIG. 11 are replaced by a series circuit of thyristors 34a and 34b.

The voltage waveform across the two terminals of the capacitor $C_p$ in the laser oscillation circuit in FIG. 12 is the same as that shown in FIG. 7.

This embodiment uses a switch whose withstand voltage is improved using the thyristors 34a and 34b as semiconductor elements, which are connected in series with each other, in place of the thyratrons 30a and 30b in FIG. 11.

Figure 13:
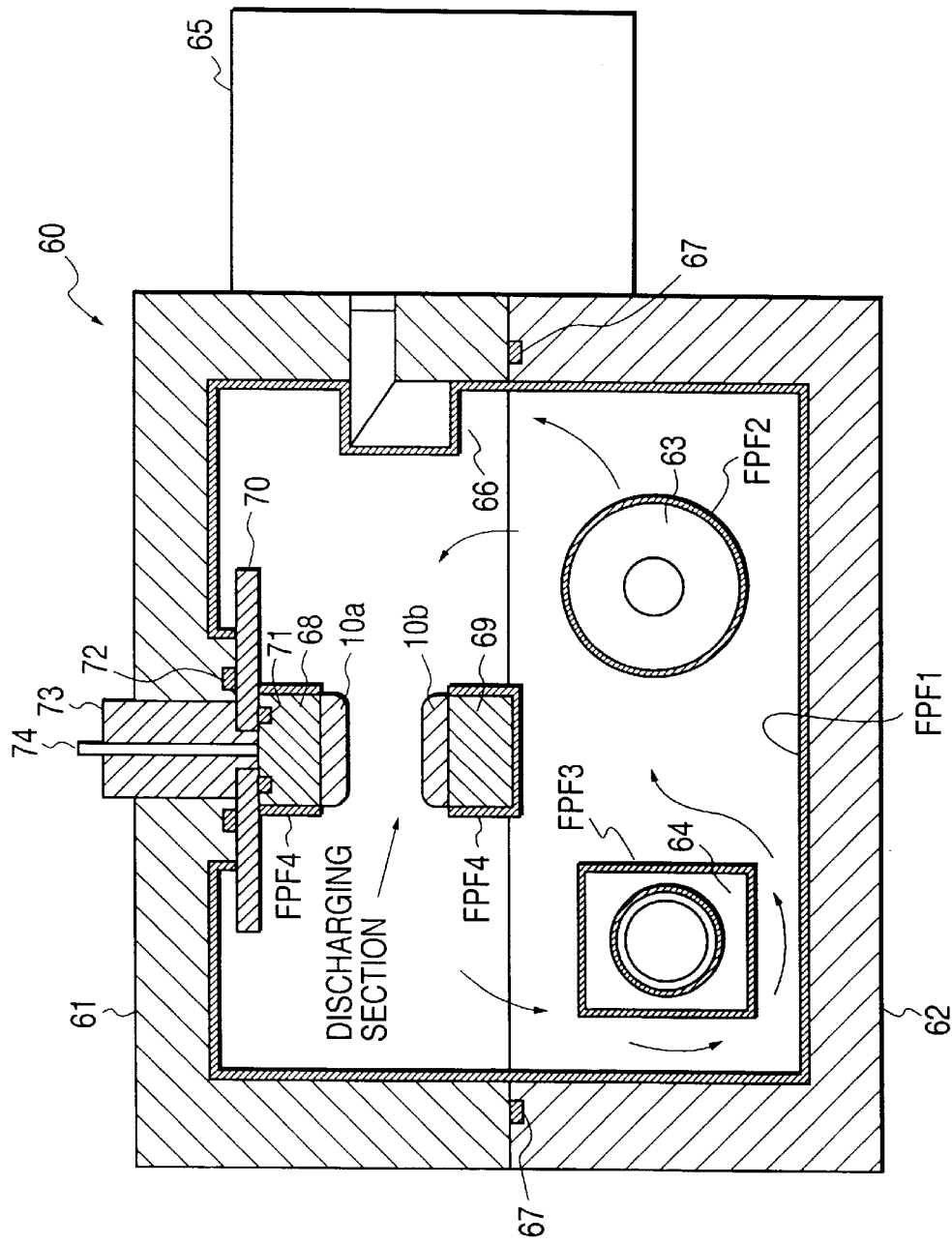
FIG. 13 is a sectional view of a laser chamber.

FIG. 13 is a sectional view showing the arrangement of a laser chamber for a laser oscillation apparatus according to the present invention, which has been described in the above embodiments.

A laser chamber 60 has, as its main constituting members, chamber walls 61 and 62 that define a reaction chamber, a blower 63 for forming a gas flow for supplying a laser gas between the pair electrodes 10a and 10b, and a heat exchanger 64 for maintaining the laser gas at a predetermined temperature by cooling it.

A dust filter 65 communicates with the interior of the chamber 60 via a dust port 66, and collects unwanted products produced by discharging.

A seal ring 67 provides a hermetic seal between the upper and lower chamber walls 61 and 62.

Furthermore, the laser chamber 60 has electrode support members 68 and 69 for supporting the electrodes 10a and 10b, insulators 70 and 73, a terminal 74 connected to the electrode 10a, and seal rings 71 and 72.

In the present invention, a fluorine passivation film FPF1 is preferably formed on the inner surface of the chamber, i.e., on the inner surfaces of the chamber walls 61 and 62, and fluorine passivation films FPF2 and FPF3 are preferably also formed on the surfaces of the blower 63 and the heat exchanger 64.

More preferably, a fluorine passivation film FPF4 is also formed on the outer surfaces of the electrode support members 68 and 69 except for their electrical contact portions.

As the fluorine passivation films (FPF1 to FPF4), nickel fluoride, aluminum fluoride, magnesium fluoride, alumina, and the like are preferably used.

Furthermore, as the pair of electrodes 10a and 10b, a metal whose oxygen content is set at 10 ppm or less is preferably used so that their shapes do not deform by fluorinating reaction and sputtering caused by discharging. Especially, a nickel alloy that contains nickel (Ni) as a major component, and also contains 1 weight % to 20 weight % of iron (Fe), chromium (Cr), and aluminum (Al) is preferably used.

As the insulator 70, calcium fluoride, magnesium fluoride, alumina, and the like with high fluorine resistance are preferably used.

The laser oscillation apparatus according to the present invention is preferably applied to apparatuses for hole forming processes in resin members, annealing of semiconductor members, formation of micropattern latent images by exposing photoresists, and the like.

An example of the hole forming processes on articles is that of ink-jet nozzles (ink ejection orifices) of ink-jet printers, and an example of annealing is a crystallization treatment of amorphous semiconductors on glass substrates.

Such apparatus comprises a support means for supporting a work, and an optical system for irradiating an excimer laser beam onto the work.

An example of the apparatus will be explained below with reference to FIG. 14.

Figure 14:
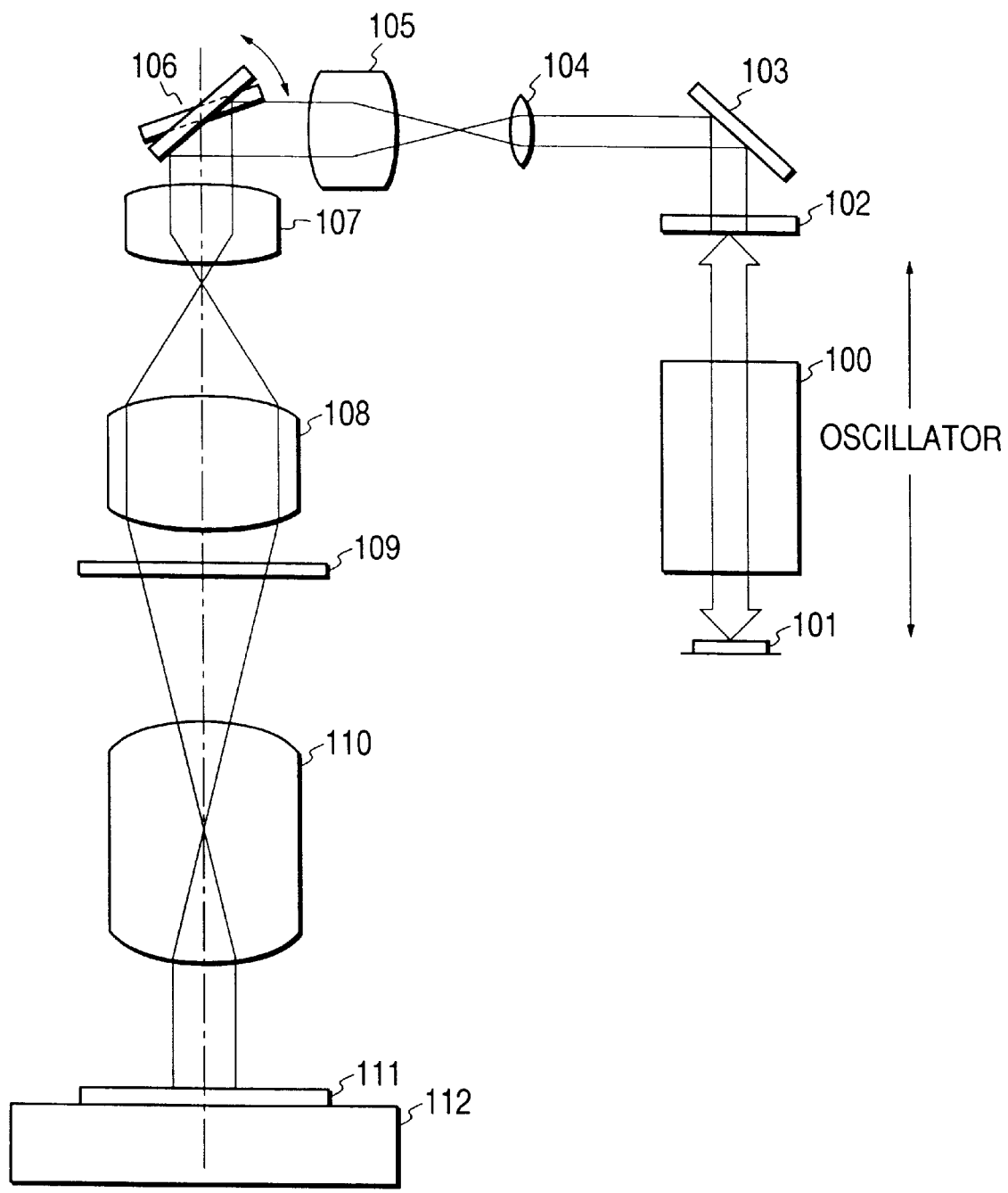
FIG. 14 is a view showing an exposure apparatus used in the manufacture of semiconductors, which uses the excimer laser oscillation apparatus.
Figure 15:
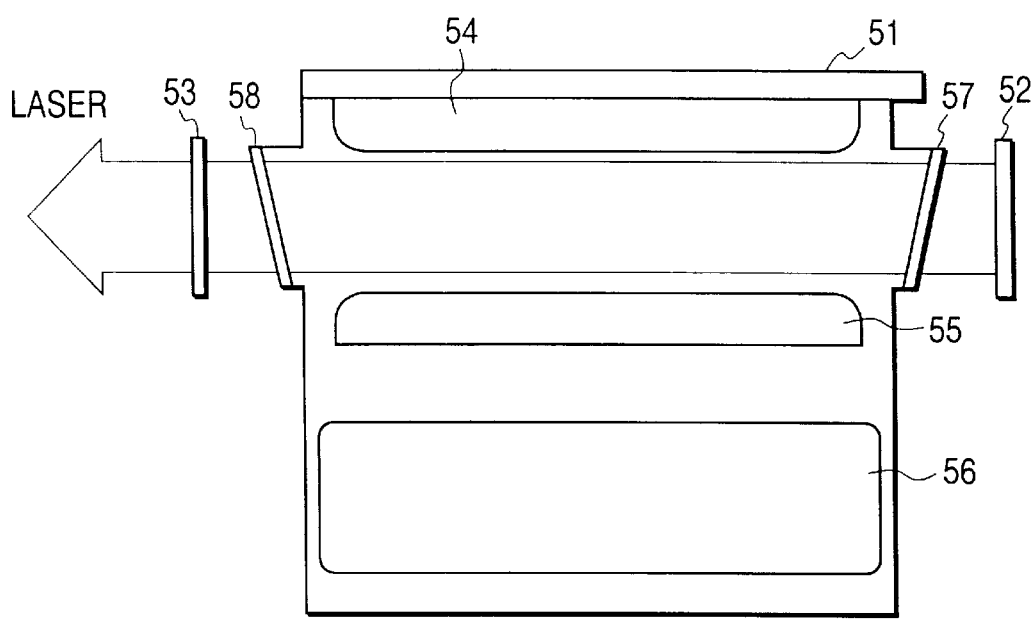
FIG. 15 is a view showing a conventional excimer laser oscillation apparatus.
Figure 18:
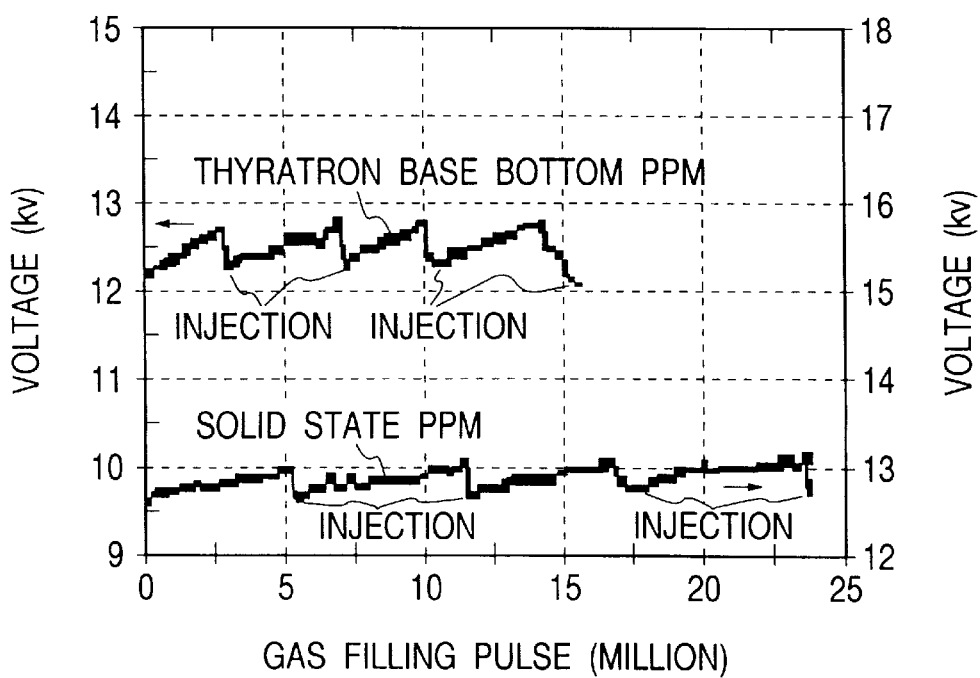
Fig. 18 is a graph for explaining the service life of the conventional excimer laser oscillation apparatus.
Figure 16A:
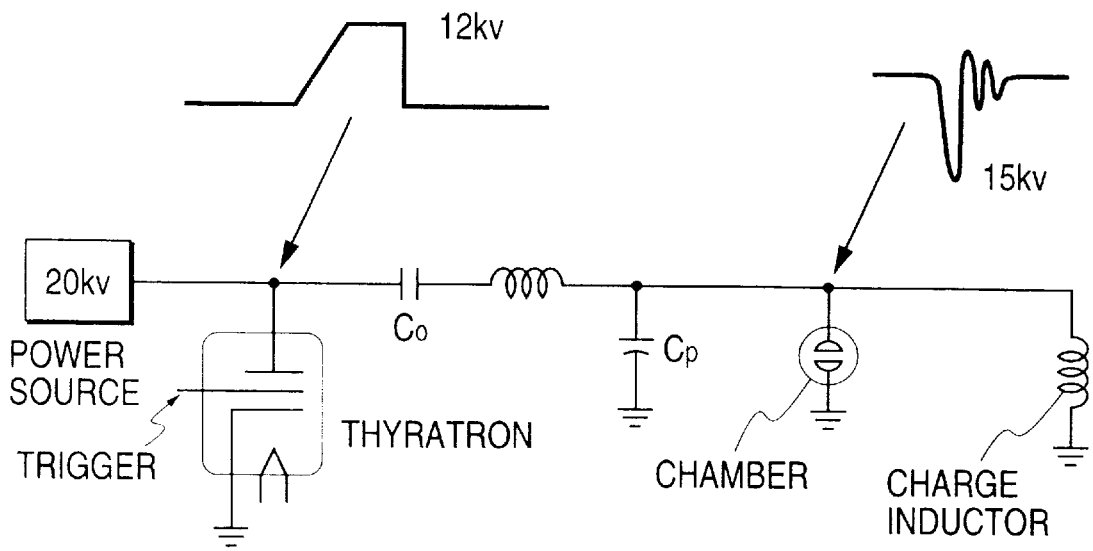
FIGS. 16A and 16B are respectively a circuit diagram and a graph showing a driving circuit and its characteristics of the conventional excimer laser oscillation apparatus.
Figure 16B:
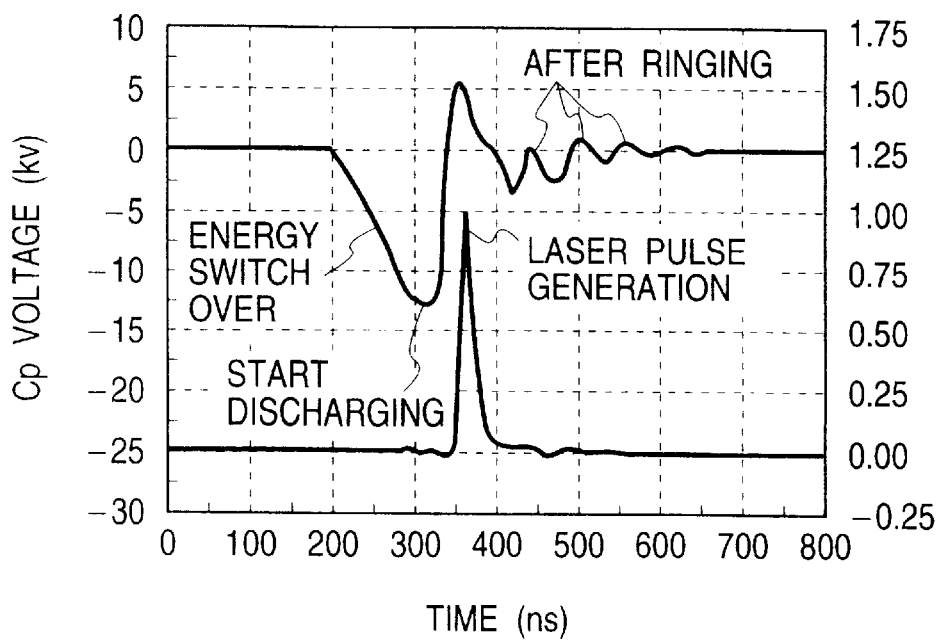
Figure 17A:
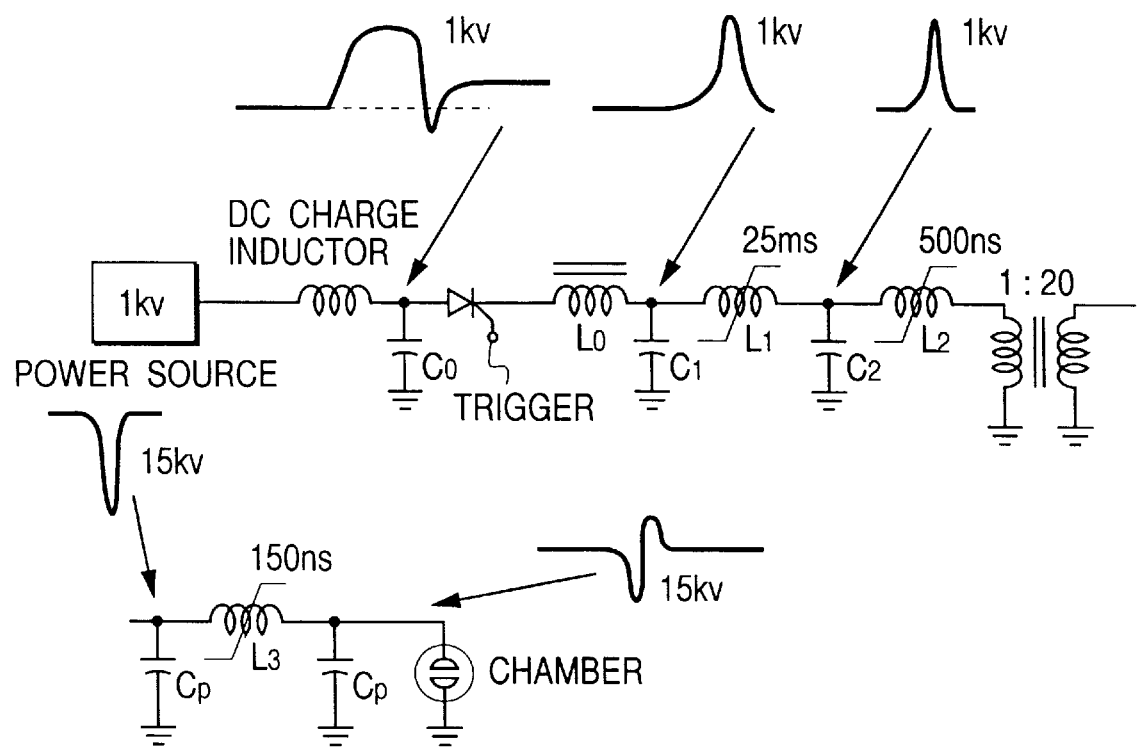
FIGS. 17A and 17B are respectively a circuit diagram and a graph showing a driving circuit and its characteristics of the conventional excimer laser oscillation apparatus.
Figure 17B:
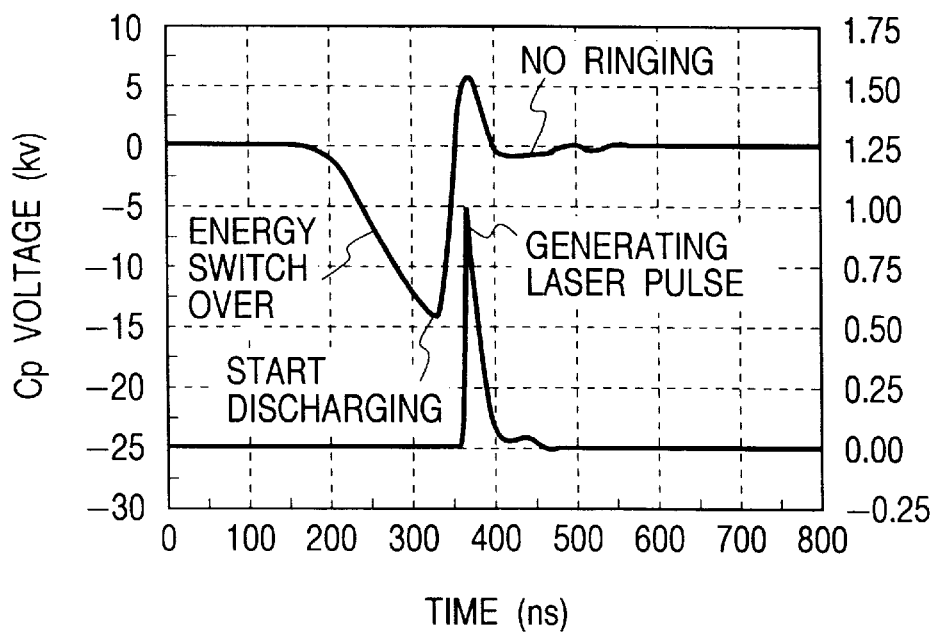

FIG. 14 shows an exposure apparatus using the excimer laser oscillation apparatus according to the present invention, which has been described in the above embodiments.

Light output from an oscillation apparatus 100 is converted into a coherent laser beam by an oscillator made up of a pair of mirrors 101 and 102, and the laser beam is guided toward a scanning optical system via a mirror 103 and lenses 104 and 105.

The scanning optical system has a scanning lens 107, and a scanning mirror 106 whose angle is variable. Light output from the scanning optical system is irradiated onto a reticle 109 having a mask pattern via a condenser lens 108. The arrangement of an illumination optical system of the exposure apparatus has been described.

Light having a density distribution corresponding to the predetermined mask pattern on the reticle 106 is imaged on the surface of a wafer 111 placed on a stage 112 by an imaging optical system having an objective lens 110, and a latent image corresponding to the mask pattern is formed on a photosensitive resist on the surface of the wafer 111.

As described above, the exposure apparatus shown in FIG. 14 can be constituted by the excimer laser oscillation apparatus 100, the illumination optical system, the imaging optical system, and the stage 112 that holds the wafer 111.

According to the apparatuses shown in FIGS. 2, 4, 6, 8, 9, and 10, one of the pair of electrodes can be held at a reference potential. That is, since the laser chamber can be connected to ground, it is easy to set the laser oscillation apparatus.

In the apparatuses shown in FIGS. 2 and 4, since one thyristor alone as a semiconductor switch element need only be used, the cost of the circuit can be reduced.

In the apparatuses shown in FIGS. 6, 8, 9, and 10, since the polarity of the voltage is changed at the primary side of the transformer, the switch element need not have a high withstand voltage.

When the exposed surfaces of the chamber inner surface are protected by fluorine passivation films, consumption of fluorine can be suppressed.

Furthermore, when the oxygen content of the electrodes is set at 10 ppm or less and, preferably, 1 ppm or less, the electrodes are hardly fluorinated, and the electrodes can be prevented from deforming upon sputtering of the fluoride on the electrode surface.

As described above, according to the present invention, the service life of the laser chamber can be prolonged. That is, the refilling period of fluorine gas can be extended, and a desired output can be obtained for a long period of time by adjusting the applied voltage alone.

What is claimed is:

1. An excimer laser oscillation apparatus comprising:
a laser chamber for storing a laser gas;
a pair of electrodes disposed in said chamber, said pair of electrodes being composed of a metallic material having an oxygen content not more than 10 ppm; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is changed by the polarity changing circuit at the predetermined period, and
the polarity changing circuit includes coils having different turn directions.

2. An excimer laser oscillation apparatus comprising:
a laser chamber for storing a laser gas;
a pair of electrodes disposed in said chamber, said pair of electrodes being composed of a metallic material having an oxygen content not more than 10 ppm; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is changed by the polarity changing circuit at the predetermined period, and
the polarity changing circuit includes coils having different turn directions, and a switch.

3. An excimer laser oscillation apparatus comprising:
a laser chamber for storing a laser gas;
a pair of electrodes disposed in said chamber, said pair of electrodes being composed of a metallic material having an oxygen content not more than 10 ppm; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is chanced by the polarity changing circuit at the predetermined period, and
the polarity changing circuit includes a pair of thyristors connected in opposite directions.

4. An excimer laser oscillation apparatus comprising:
a laser chamber for storing a laser gas;
a pair of electrodes disposed in said chamber, said pair of electrodes being composed of a metallic material having an oxygen content not more than 10 ppm; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is changed by the polarity changing circuit at the predetermined period, and
the polarity changing circuit includes a switch for applying a voltage having an opposite polarity to a coil on the primary side.

5. An excimer laser oscillation apparatus comprising:
a laser chamber for storing a laser gas;
a pair of electrodes disposed in said chamber, said pair of electrodes being composed of a metallic material having an oxygen content not more than 10 ppm; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is changed by the polarity changing circuit at the predetermined period, and
a circuit for compressing a pulse width of a charging/discharging voltage is connected to the secondary side of the transformer.

6. An excimer laser oscillation apparatus comprising:
a laser chamber for storing a laser gas;
a pair of electrodes disposed in said chamber, said pair of electrodes being composed of a metallic material; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is changed by the polarity changing circuit at the predetermined period, and
the polarity changing circuit includes coils having different turn directions.

7. An excimer laser oscillation apparatus comprising:
a laser chamber for storing a laser gas;
a pair of electrodes disposed in said chamber, said pair of electrodes being composed of a metallic material; and
a voltage application circuit for applying a voltage to said pair of electrodes to excite the laser gas,
wherein said pair of electrodes are connected to a secondary side of a transformer,
a polarity changing circuit for changing a polarity of an induction voltage at a predetermined period is connected to a primary side of the transformer,
the polarity of the voltage applied across said pair of electrodes is changed by the polarity changing circuit at the predetermined period, and
the polarity changing circuit includes coils having different turn directions, and a switch.

8. An excimer laser oscillation apparatus comprising:

a laser chamber for storing a laser gas;

a pair of electrodes disposed in said chamber, said pair of electrodes being composed of a metallic material; and a voltage application circuit for applying a voltage to said pair of electrodes to excite the laser gas, wherein said pair of electrodes are connected to a secondary side of a transformer, a polarity changing circuit for changing a polarity of an induction voltage at a predetermined period is connected to a primary side of the transformer, the polarity of the voltage applied across said pair of electrodes is changed by the polarity changing circuit at the predetermined period, and the polarity changing circuit includes a pair of thyristors connected in opposite directions.

9. An excimer laser oscillation apparatus comprising:

a laser chamber for storing a laser gas;

a pair of electrodes disposed in said chamber, said pair of electrodes being composed of a metallic material; and a voltage application circuit for applying a voltage to said pair of electrodes to excite the laser gas, wherein said pair of electrodes are connected to a secondary side of a transformer, a polarity changing circuit for changing a polarity of an induction voltage at a predetermined period is connected to a primary side of the transformer, the polarity of the voltage applied across said pair of electrodes is changed by the polarity changing circuit at the predetermined period, and the polarity changing circuit includes a switch for applying a voltage having an opposite polarity to a coil on the primary side.

10. An excimer laser oscillation apparatus comprising:

a laser chamber for storing a laser gas;

a pair of electrodes disposed in said chamber, said pair of electrodes being composed of a metallic material; and a voltage application circuit for applying a voltage to said pair of electrodes to excite the laser gas, wherein said pair of electrodes are connected to a secondary side of a transformer, a polarity changing circuit for changing a polarity of an induction voltage at a predetermined period is connected to a primary side of the transformer, the polarity of the voltage applied across said pair of electrodes is changed by the polarity changing circuit at the predetermined period, and a circuit for compressing a pulse width of a charging/discharging voltage is connected to the secondary side of the transformer.

* * * * *

UNITED STATES PATENT AND TRADEMARK OFFICE
CERTIFICATE OF CORRECTION

PATENT NO. : 6,282,221 B1
DATED : August 28, 2001
INVENTOR(S) : Tadahiro Ohmi et al.

Page 1 of 1

It is certified that error appears in the above-identified patent and that said Letters Patent is hereby corrected as shown below:

<u>Column 9,</u>
Line 57, "chanced" should read -- changed --.

Signed and Sealed this

Nineteenth Day of March, 2002

Attest:

JAMES E. ROGAN
*Director of the United States Patent and Trademark Office*

*Attesting Officer*